March 24, 1970  R. T. BAILEY ETAL  3,501,945
INSPECTION HEAD
Filed Feb. 8, 1965  2 Sheets-Sheet 1
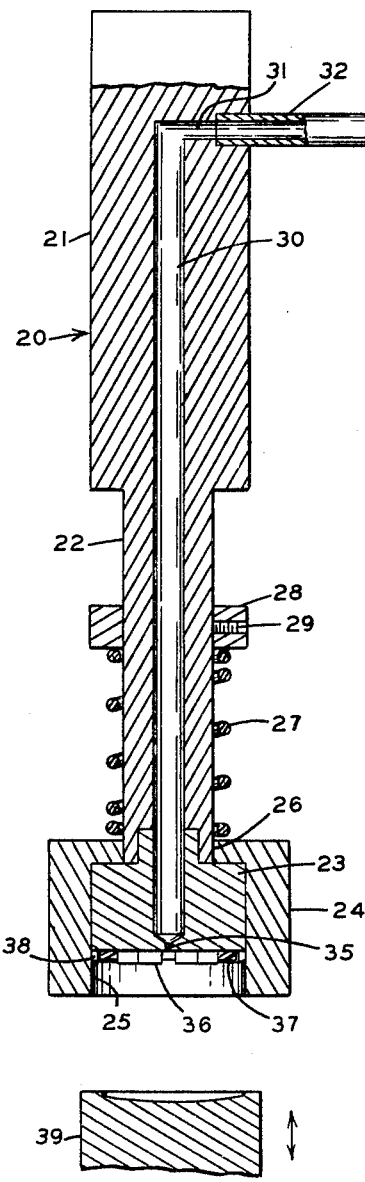
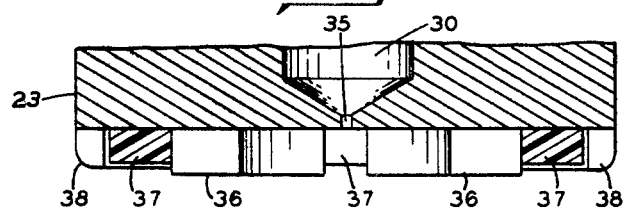
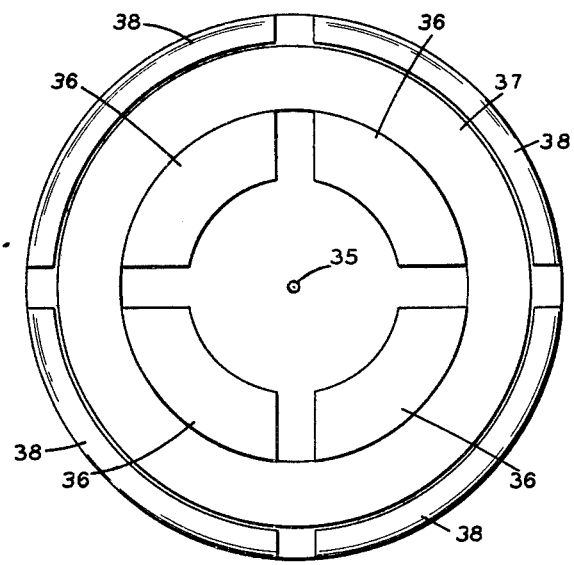
INVENTOR
RICHARD T. BAILEY
JAMES E. HAZELTINE, JR.
DONALD H. STRAUB
BY
ATTORNEY

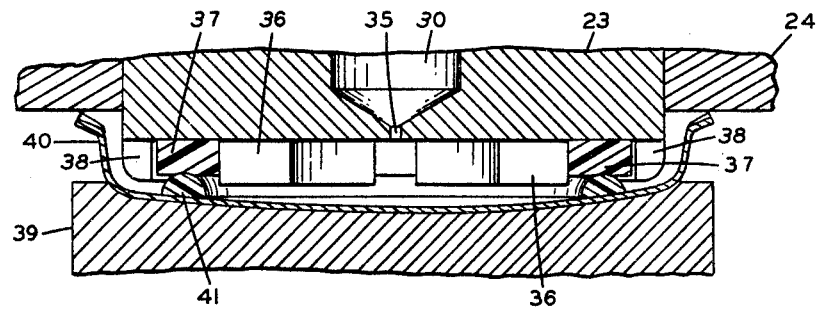

United States Patent Office 3,501,945
Patented Mar. 24, 1970

3,501,945
INSPECTION HEAD
Richard T. Bailey, Rohrerstown, James E. Hazeltine, Jr., Lancaster County, and Donald H. Straub, Mount Joy, Pa., assignors to Armstrong Cork Company, Lancaster, Pa., a corporation of Pennsylvania
Filed Feb. 8, 1965, Ser. No. 431,056
Int. Cl. G01m 3/04
U.S. Cl. 73—40                                    6 Claims

ABSTRACT OF THE DISCLOSURE

An inspection device for the testing of the linings for closures. The liner in a closure is tested by placing a plunger with a resilient ring adjacent the upper surface of the liner to form a pocket in which a vacuum may be pulled. A sleeve around the plunger presses on the outer edge of the closure. The direction of the pressure on the outer edge of the closure and the pressure on the center of the closure due to the existence of a vacuum result in a testing of the sealing quality of the liner.

---

In application Ser. No. 431,055, now Patent No. 3,360,983, there is shown apparatus for inspecting articles such as closures. This apparatus is provided with an inspection head having a rigid, inspection ring. Articles having sealing liners such as closures are positioned adjacent the inspection head such that the sealing liner associated with the closure will be located in contact with the rigid inspection ring in sealing relationship therewith if the sealing ring in the closure is acceptable. The inspection head is provided with vacuum means to evacuate the inner portion of the closure interiorly of the sealing ring. If the sealing ring has defects of such an extent that an inadequate seal will be provided, air flow from the exterior of the closure through the sealing ring will result. In such a case the retention force created by the pressure differential acting on the closure tending to hold it against the inspection head will be reduced to an amount which will be less than the force applied to the periphery of the closure by means of a spring biased sleeve which in this case will strip the closure from the inspection head. This stripping action indicates the presence of a defective sealing liner in a closure. However, if the above-noted defects are not present in a particular sealing liner, said liner and its associated closure will be retained on the inspection head in spite of the force applied by the spring biased sleeve tending to strip the closure from the inspection head.

Although this type of inspection head performed satisfactorily, it was found that certain types of sealing rings could not be inspected thereon in a satisfactory manner. For example, closures having sealing liners of the plastisol type sometimes have slightly irregular portions. In these cases, the rigid inspection ring of the apparatus noted above sometimes would not properly seat on the sealing ring of the liner, and said closure would be rejected. It was found that the irregular portions on some of these closures were not sufficient to produce a defective seal when the closure was applied to a commercial package. In other words, although the inspection device had rejected a particular closure having a sealing liner with an irregular portion, said closure would provide a commercially acceptable seal with the container to which it is applied if the irregularity was not extensive. Thus, the rigid inspection ring was found to be too sensitive to minor variations in ring geometry in some cases.

The device of the present invention overcomes the problems noted above by providing a relatively wide, planar, resilient inspection member. Such a resilient inspection member will form an adequate seal with those closure liners having an acceptable degree of irregularity, thereby avoiding false rejection thereof. The resilient member of the present invention will provide a broad planar surface which will readily inspect various shapes and sizes of sealing rings including those having acceptable variations in ring geometry.

It is an object of the present invention to provide an inspection head having a resilient inspection member.

Other objects of the present invention will be readily apparent from the detailed description thereof with reference to the drawings wherein:

FIGURE 1 is a view in elevation with portions broken away of an inspection head according to the present invention;

FIGURE 2 is an enlarged, partial, sectional view in elevation of the article-receiving portion of the inspection head shown in FIGURE 1;

FIGURE 3 is a bottom view of the article-receiving portion of the inspection head shown in FIGURE 1; and FIGURE 4 is an enlarged, partial, sectional view in elevation of a closure having a sealing liner in inspection position with respect to an inspection head similar to that shown in FIGURES 1 to 3.

Referring to FIGURE 1, there is shown an inspection head assembly 20 which is similar in most respects except for the details of the closure-receiving portion to the inspection head shown and described in application Ser. No. 431,055 noted above. Inspection head 20 includes an upper body 21 having a neck 22 depending therefrom. A lower body 23 is secured to and depends from neck 22. The lateral extent of neck 22 is reduced in comparison to lateral extent of either the upper body 21 or lower body 23.

A sleeve 24 surrounds lower body 23 and a portion of neck 22. Sleeve 24 is provided with a bore 25 which extends upwardly from the lower surface thereof and receives lower body 23. A bore 26 having a smaller lateral extent than bore 25 extends downwardly from the upper portion of sleeve 24 into communication with bore 25 in aligned relationship therewith. It is apparent that the shoulder formed by the juncture of neck 22 and lower body 23 provides a lower limit for downward movement of sleeve 24 by providing a stop for the annular flange formed by the juncture of bores 25 and 26. However, sleeve 24 may move upwardly with respect to neck 22 and lower body 23 to the extent allowed by spring 27 which surrounds neck 22 between the upper portion of sleeve 24 and the lower surface of collar 28 which surrounds neck 22. Collar 28 is provided with adjustable set screw 29 whereby the position of collar 28 with respect to neck 22 may be varied to vary the effect of the spring 27 on sleeve 24. Inspection head 20 has a central bore 30 which communicates at its upper end with a lateral passage 31. A nipple 32 is secured to upper body 21 and communicates with passage 31. Suitable conduit means 33 may connect nipple 32 to a source of vaccum 34. Conduit 30 opens to the exterior of inspection head 20 through orifice 35 located in the lower portion of lower body 23.

Surrounding orifice 35 are a plurality of circumferentially spaced, arcuate, feeler segments 36. Surrounding feeler segments 36 is a resilient, annular inspection or gauge member 37 which may be of polyurethane, for example. Exteriorly of inspection member 37 are a plurality of circumferentially spaced, arcuate, feeler segments 38 which are similar to feeler segments 36.

Inspection head 20 as noted above has the same general configuration as the inspection head disclosed in the apparatus in application Ser. No. 431,055. Inspection head 20 is designed to operate in a similar manner and may be substituted for that inspection head shown in the aforementioned application. As in application Ser. No. 431,055, a chuck such as that designated as 39 is provided to locate an article having a sealing ring to be inspected such as a closure, for example, in inspection position with respect to the closure-receiving portion of lower body 23 as shown in FIGURE 4. In such a position sleeve 24 has been moved upwardly with respect to lower body 23 against the bias of spring 27 by the periphery of closure 40. The vacuum from source 34 is continuously applied through orifice 35, bore 30, passage 31, nipple 32, and conduit means 33.

If sealing ring 41 seats properly with respect to inspection member 37 in a manner to form an acceptable seal therebetween, the air in the interior of the closure will be evacuated through the orifice thereby creating a pressure differential between the inner and outer portions of the closure 40. This pressure differential acts on closure 40 to provide a retention force tending to maintain the closure in the inspection position shown in FIGURE 4 against the downward stripping force exerted by spring 27 through sleeve 24 and by the weight of said sleeve 24 on the periphery of closure 40. When an acceptable seal is formed between the members as stated above, the retention force will be greater than the stripping force, and the closure will remain in inspection position even though chuck 39 is withdrawn from the position shown in FIGURE 4. When this condition occurs, the presence of an acceptable sealing liner is indicated. The closure may then be manually or otherwise removed from the inspection head.

If, however, there is a defect in sealing ring 41 which is sufficient to provide an unacceptable seal with member 37, a flow of air will pass to the interior of closure 40. In this case the pressure differential will be less than that mentioned above where there is no air flow to the interior portion of the closure 40. The reduced pressure differential between the inner and outer portions of closure 40 results in a lower retention force. Collar 28 is so adjusted as to compress spring 27 a predetermined amount. This results in a predetermined stripping force being applied to closure 40 through sleeve 24. The proper stripping force may be determined by experimentation so that it will be greater than the retention force acting on closures having unacceptable sealing liners 41. Thus, when chuck 39 is withdrawn from the inspection position shown in FIGURE 4, sleeve 24 will descend thereby stripping closure 40 from inspection head 20. The closure 40 with such a defective sealing liner may then be segregated from the closures having acceptable sealing liners.

It should be noted that the resilient, annular member 37 will allow for non-critical defects in the surface of sealing ring 41 without rejecting said sealing ring 41. In other words, resilient inspection member 37 will be somewhat compressed as shown in FIGURE 4 by the sealing ring 41. In this manner, acceptable irregularities in sealing ring 41 will be accommodated by resilient member 37 to provide a sufficient seal to prevent false rejection thereof.

It is apparent that the planar surface of resilient member 37 is such that it can accommodate and inspect sealing rings and members having various shapes and sizes within the limits imposed by feeler segments 36 and 38 which operate in the same manner as the feeler segments in the above-noted application to reject sealing members having insufficient height, out-of-round portions, too large a diameter, too small a diameter, etc.

Thus, it is apparent that the device of the present invention provides for accurate inspection of sealing rings in articles. Further, the device of the present invention provides a simple, relatively uncomplex apparatus for the inspection of sealing rings. The apparatus according to the present invention is economical to manufacture and maintain in relation to the prior art devices. It should be noted that the shape and size of inspection ring and feeler means depend upon the size and shape of the sealing ring, closure, and closure to be inspected. The device of the present invention may be used to inspect defects in many types of sealing means in articles and is not limited to inspecting sealing rings in closures or a particular type of sealing ring in a particular type of closure. Similarly, the inspection apparatus of the present invention may be used to inspect sealing means of many different types of materials and is not limited to the inspection of those materials described herein. It is to be understood that all elements including the inspection head may be sectionalized and secured together with conventional fastening means for assembly purposes as would be obvious to a skilled mechanic or machinist. It is to be understood that the composition, shapes, sizes, and relative location, and materials of construction of the elements of the present invention may be varied and that the present invention is not limited to the specific embodiment shown and described herein. For example, the number of arcuate segments and positioning thereof as well as the spaces therebetween may be varied and staggered without departing from the scope of the present invention.

Various modifications of the present invention will occur to those skilled in the art without departing from the spirit and scope thereof.

We claim:
1. An inspection head comprising a body including an article-receiving portion, orifice means on said article receiving portion, passage means in said body connecting said orifice means with the exterior of said body at a point spaced from said article receiving portion, resilient, annular, gauge means on said article-receiving portion surrounding said orifice means, sleeve means surrounding said body adjacent said article-receiving portion, and adjustable bias means to bias said sleeve means against the peripheral edge portion of the article being tested and to provide a force tending to dislodge said article from its test position, said passage means connected to the chamber formed by the article, the gauge means and the article-receiving portion to provide a force opposing the first-mentioned force whereby leakage past the gauge and article causes a force differential and rejection of the article, said article being tested is the liner of a closure and said gauge means is formed of a resilient means having only a sufficient resiliency to conform to irregular portions of the closure liner, the irregular portions being conformed to would not produce a defective seal when the closure is placed on a container, but are such that a rigid gauge means would reject the closure as defective.

2. An inspection head according to claim 1 further comprising inner feeler means located on said article-receiving portion between said orifice means and said resilient, annular gauge means, said feeler means extending outwardly from said article-receiving portion.

3. An inspection head according to claim 2 further comprising outer feeler means located on said article-receiving portion outwardly of said annular gauge means.

4. An inspection head according to claim 1 further comprising feeler means located on said article-receiving portion outwardly of said annular gauge means.

5. A valveless inspection head comprising a body including an article-receiving portion, orifice means on said article-receiving portion, valveless passage means in said body connecting said orifice means with the exterior of said body at a point spaced from said article-receiving portion, resilient, annular, gauge means on said article-receiving portion surrounding said orifice means, sleeve means surrounding said body adjacent said article-receiving portion, and adjustable bias means to bias said sleeve means against the peripheral edge portion of the article being tested and to provide a force tending to dislodge said article from its test position, said passage means connected to the chamber formed by the article, the gauge means and the article-receiving portion to provide a force opposing the first-mentioned force whereby leakage past the gauge and article causes a force differential and rejection of the article, said article being tested is the liner of a closure and said gauge means is formed of a resilient means having only a sufficient resiliency to conform to irregular portions of the closure liner, the irregular portions being conformed to would not produce a defective seal when the closure is placed on a container, but are such that a rigid gauge means would reject the closure as defective.

6. A valveless inspection head according to claim 5 further comprising feeler means located on said article-receiving portion.

References Cited

UNITED STATES PATENTS

| | | | |
|---|---|---|---|
| 2,399,391 | 4/1946 | Russell | 73—45.4 |
| 2,618,964 | 11/1952 | Byrkett | 73—37 |
| 2,618,965 | 11/1952 | Gray | 73—37 |
| 2,901,906 | 9/1959 | Emmons | 73—37 |
| 3,015,388 | 1/1962 | Wilckens | 73—45 |

LOUIS R. PRINCE, Primary Examiner

HARRY C. POST III, Assistant Examiner

U.S. Cl. X.R.

73—49.2